United States Patent
Jin et al.

(10) Patent No.: US 12,525,654 B2
(45) Date of Patent: Jan. 13, 2026

(54) ELECTRODE ASSEMBLY, BATTERY CELL, BATTERY, AND METHOD AND DEVICE FOR MANUFACTURING ELECTRODE ASSEMBLY

(71) Applicant: CONTEMPORARY AMPEREX TECHNOLOGY (HONG KONG) LIMITED, Hong Kong (CN)

(72) Inventors: Haizu Jin, Ningde (CN); Hu Xu, Ningde (CN); Xinxin Du, Ningde (CN); Xing Li, Ningde (CN); Chengdu Liang, Ningde (CN); Yuqun Zeng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 948 days.

(21) Appl. No.: 17/717,736

(22) Filed: Apr. 11, 2022

(65) Prior Publication Data
US 2022/0246993 A1    Aug. 4, 2022

Related U.S. Application Data

(63) Continuation of application No. PCT/CN2021/070716, filed on Jan. 7, 2021.

(51) Int. Cl.
*H01M 10/0587* (2010.01)
(52) U.S. Cl.
CPC .... *H01M 10/0587* (2013.01); *H01M 2220/20* (2013.01)
(58) Field of Classification Search
CPC ......................... H01M 50/531; H01M 10/0587
See application file for complete search history.

(56) References Cited

U.S. PATENT DOCUMENTS

| | | |
|---|---|---|
| 2009/0291929 A1 | 11/2009 | van der Louw et al. |
| 2014/0329117 A1 | 11/2014 | Kubota et al. |
| | (Continued) | |

FOREIGN PATENT DOCUMENTS

| | | |
|---|---|---|
| CN | 102201594 A | 9/2011 |
| CN | 205828556 U | 12/2016 |
| | (Continued) | |

OTHER PUBLICATIONS

Extended European Search Report dated Jun. 20, 2022 received in European Patent Application No. EP 21810882.7.
(Continued)

*Primary Examiner* — Olatunji A Godo
(74) *Attorney, Agent, or Firm* — Scully, Scott, Murphy & Presser, P.C.

(57) ABSTRACT

Embodiments of the present application provide an electrode assembly, a battery cell, a battery, and a method and a device for manufacturing an electrode assembly. The electrode assembly includes a first electrode plate and a second electrode plate. The first electrode plate and the second electrode plate are wound along a winding direction to form a winding structure, and the winding structure includes a bending region. The first electrode plate includes a first segment that exceeds a winding starting end of the second electrode plate, and at least a part of the first segment is configured to provide a support force to a part of the first electrode plate and the second electrode plate in the bending region and located at an outer side the first segment, making a structure of the first electrode plate and the second electrode plate more compact in the bending region.

14 Claims, 12 Drawing Sheets

(56) References Cited

U.S. PATENT DOCUMENTS

2016/0268581 A1\* 9/2016 Ahn .................. H01M 10/0431
2022/0052386 A1 2/2022 Wang et al.

FOREIGN PATENT DOCUMENTS

| CN | 205828576 U | 12/2016 |
| CN | 205882099 U | 1/2017 |
| CN | 205992575 U | 3/2017 |
| CN | 206401455 U | 8/2017 |
| CN | 206401456 U | 8/2017 |
| CN | 107302110 A | 10/2017 |
| CN | 108206302 A | 6/2018 |
| CN | 207572477 U | 7/2018 |
| CN | 208226027 U | 12/2018 |
| CN | 109524606 A | 3/2019 |
| CN | 109728358 A | 5/2019 |
| CN | 110808377 A | 2/2020 |
| CN | 210092264 U | 2/2020 |
| CN | 111916844 A | 11/2020 |
| JP | 2003142083 A | 5/2003 |
| JP | 3860016 B2 | 12/2006 |
| JP | 2009289570 A | 12/2009 |
| JP | 2014056742 A | 3/2014 |
| WO | 2018012465 A1 | 1/2018 |
| WO | 2019235476 A1 | 12/2019 |
| WO | 2020110975 A1 | 6/2020 |

OTHER PUBLICATIONS

Notice of First Office Action dated Jun. 5, 2023 received in Chinese Patent Application No. CN 202180017077.8.
Notice of Second Office Action dated Aug. 23, 2023 received in Chinese Patent Application No. CN 202180017077.8.
Notice of Reasons for Refusal dated Dec. 9, 2024 for Japanese Patent Application No. 2023-514803.
Notice of Preliminary Rejection dated Nov. 14, 2024 for Korean Patent Application No. 10-2023-7006407.
Notice of Reasons for Refusal dated May 29, 2024 received in Chinese Patent Application No. CN 2023-514803, 13 pages.

\* cited by examiner

ELECTRODE ASSEMBLY, BATTERY CELL, BATTERY, AND METHOD AND DEVICE FOR MANUFACTURING ELECTRODE ASSEMBLY

CROSS-REFERENCE To ELATED APPLICATIONS

This application is a continuation of International Application No. PCT/CN2021/070716, filed on Jan. 7, 2021, the disclosure of which is hereby incorporated by reference in its entirety.

TECHNICAL HELD

The present application relates to the technical field of batteries, and in particular, to an electrode assembly, a battery cell, a battery, and a method and a device for manufacturing an electrode assembly.

BACKGROUND

Currently, the most commonly used batteries in vehicles are lithium-ion batteries. As a rechargeable battery, lithium-ion batteries have the advantages of small size, high energy density, high power density, multiple recycle times, and long storage time. A rechargeable battery includes an electrode assembly and an electrolyte solution, and the electrode assembly is composed of a second electrode plate, a first electrode plate, and a separator. The operation of the rechargeable battery mainly relies on movement of metal ions between the second electrode plate and the first electrode plate.

Lithium plating is a common abnormal phenomenon of lithium batteries. Lithium-ions that cannot be intercalated in the negative electrode can only gain electrons on a surface of the negative electrode due to abnormalities such as insufficient space for lithium to be intercalated in the negative electrode, excessive resistance to lithium-ion migration, or lithium-ions detaching from the positive electrode too quickly but not being able to be intercalated in the negative electrode in equal amounts, resulting in the formation of elementary substance lithium. Lithium plating will affect the charging efficiency and energy density of lithium-ions. When the lithium plating is serious, lithium crystals can further be formed, and lithium crystals can pierce the separator and cause internal short-circuit thermal runaway, which seriously endangers the safety of the battery. Therefore, how to reduce lithium plating is an urgent technical problem to be solved in the battery technology.

SUMMARY

Embodiments of the present application provide an electrode assembly, a battery cell, a battery, and a method and a device for manufacturing an electrode assembly, which can effectively reduce the occurrence of lithium plating.

In a first aspect, an embodiment of the present application provides an electrode assembly, including a first electrode plate and a second electrode plate, where the first electrode plate and the second electrode plate are wound in a winding direction to form a winding structure, and the winding structure includes a bending region; and the first electrode plate includes a first segment that exceeds a winding starting end of the second electrode plate, and at least a part of the first segment is configured to provide a support force to a part of the first electrode plate and the second electrode plate in the bending region and located at an outer side the first segment.

In the above solution, the first electrode plate includes a first segment that exceeds a winding starting end of the second electrode plate, and the first segment can provide a support force to a part of the first electrode plate and the second electrode plate in the bending region and located at an outer side the first segment, making a structure of the part of the first electrode plate and the second electrode plate in the bending region more compact. And a gap between the part of the first electrode plate in the bending region and the part of the second electrode plate in the bending region is not easy to be expanded by an external force and the occurrence of lithium plating is reduced.

In some embodiments, the first electrode plate further includes a second segment continuously arranged with the first segment along the winding direction, a junction of the first segment and the second segment is located at an inner side of the winding starting end of the second electrode plate; and the at least a part of the first segment is supported at an inner side of the second segment in the bending region.

In the above scheme, the junction of the first segment and the second segment is located at an inner side of the winding starting end of the second electrode plate. The part of the first segment in the bending region can be supported at the inner side of the second segment, and the support force provided by the part of the first segment in the bending region can be first transmitted to the second segment, and then to the second electrode plate through the second segment, so that the first segment can produce better support to the part of the first electrode plate in the bending region and the part of the second electrode plate in the bending region.

In some embodiments, the electrode assembly further includes a separator for isolating the first electrode plate from the second electrode plate; and the part of the first segment in the bending region is supported at the inner side of the second segment in the bending region through the separator.

In the above solution, the separator performs the function of isolating the first electrode plate and the second electrode plate, reducing the risk of short circuit between the first electrode plate and the second electrode plate. The part of the first segment located in the bending region is supported at the inner side of the second segment through the separator. The support force provided by the part of the first segment in the bending region can be transmitted to the second segment through the separator, and the separator can isolate the part of the first segment in the bending region from the part of the second segment in the bending region.

In some embodiments, the second segment includes a first subsegment continuously arranged with the first segment along the winding direction; only one surface of the first subsegment is opposite to an active material layer of the second electrode plate, the first subsegment is wound one lap outward along the winding direction from the junction; and the first segment includes a bending portion bent and arranged in the bending region, and the bending portion is supported at the first subsegment in the bending region.

In the above solution, the bending portion of the first segment is supported at the first subsegment in the bending region, and the bending portion is in a bent state in the bending region, which can produce a good support effect for the first subsegment.

In some embodiments, both surfaces of the first subsegment are coated with active material layers; or one surface of the first subsegment opposite to the active material layer of the second electrode plate is coated with an active material layer, and the other surface of the subsegment is not coated with an active material layer.

In the above scheme, it may be that both surfaces of the first subsegment are coated with active material layers, which can simplify the production process of the first electrode plate and facilitate the formation of the first electrode plate. It may also be that one surface of the first subsegment opposite to the active material layer of the second electrode plate is coated with an active material layer, and the other surface of the subsegment is not coated with an active material layer which reduces the amount of the active material layer on the first electrode plate and reduces the production cost of the first electrode plate.

In some embodiments, the second segment further includes a second subsegment and a third subsegment; the first segment, the first subsegment, the second subsegment, and the third subsegment are continuously arranged along the winding direction in sequence; both surfaces of the second subsegment are opposite to the active material layer of the second electrode plate; only one surface of the third subsegment is opposite to the active material layer of the second electrode plate; where both surfaces of the third subsegment are coated with active material layers; or one surface of the third subsegment opposite to the active material layer of the second electrode plate is coated with an active material layer, and the other surface of the third subsegment is not coated with an active material layer.

In the above solution, when only one surface of the third subsegment is opposite to the active material layer of the second electrode plate, it may be that both surfaces of the third subsegment is coated with active material layers, which can simplify the production process of the first electrode plate and facilitate the formation of the first electrode plate. It may also be that one surface of the third subsegment opposite to the active layer of the second electrode plate is coated with an active material layer, and the other surface of the third subsegment is not coated with an active material layer, which reduces the amount of the active material layer on the first electrode plate and reduces the production cost of the first electrode plate.

In some embodiments, the second segment further includes a fourth subsegment; the first segment, the first subsegment, the second subsegment, the third subsegment, and the fourth subsegment are continuously arranged along the winding direction in sequence; neither surface of the fourth subsegment is opposite to the active material layer of the second electrode plate; and both surfaces of the fourth subsegment are coated with active material layers, or one surface of the fourth subsegment located at an inner side of the fourth subsegment is coated with an active material layer, and the other surface of the fourth subsegment is not coated with an active material layer.

In the above solution, neither surface of the fourth subsegment is opposite to the active material layer of the second electrode plate, both surfaces of the fourth subsegment may be coated with active material layers, which can simplify the production process of the first electrode plate and facilitate the formation of the first electrode plate. It may also be that one surface of the fourth subsegment located at an inner side of the fourth subsegment is coated with an active material layer, and the other surface of the fourth subsegment is not coated with an active material layer, which reduces the amount of the active material layer on the first electrode plate and reduces the production cost of the first electrode plate.

In some embodiments, the winding structure further includes a straight region, and both ends of the straight region are provided with bending regions; and a winding starting end of the first electrode plate is located in the straight region; and/or, the winding starting end of the second electrode plate is located in the straight region.

In the above solution, the winding starting end of the first electrode plate may be located in the straight region, and the winding starting end of the second electrode plate may also be located in the straight region, so as to facilitate the winding of the first electrode plate and the second electrode plate.

In some embodiments, the first segment is wound inward from the junction and extended around one of the bending regions.

In the above solution, the first segment is wound inward from the junction with the second segment and extended around a bending region, that is, the first segment can provide a support force to the part of the first electrode plate and the second electrode plate in the bending region. The first segment of this structure is shorter, which saves material and reduces costs.

In some embodiments, the winding starting end of the first electrode plate and the winding starting end of the second electrode plate are both located in the straight region; two bending regions are located at two ends of the straight region in a first direction; a part of the first electrode plate extending from the winding starting end of the first electrode plate to one of the bending regions and a part of the second electrode plate extending from the winding starting end of the second electrode plate to the other bending region are staggered in a second direction; and the second direction is perpendicular to the first direction and the straight region.

In the above solution, a part of the first electrode plate extending from the winding starting end of the first electrode plate to one of the bending regions and a part of the second electrode plate extending from the winding starting end of the second electrode plate to the other bending region are staggered in a second direction, this structure can effectively reduce a thickness difference between the two sides of the winding structure in the first direction, ensure the consistency of the thickness of the two sides of the winding structure in the first direction, and improve the energy density of the electrode assembly.

In some embodiments, the first segment is wound inward from the junction and extended around the two bending regions.

In the above solution, the first segment is wound inward from the junction with the second segment and extended around the two bending regions, that is, the first segment can provides a support force to the part of the first electrode plate and the second electrode plate located at, the two bending regions, which makes a structure of the part of the first electrode plate and the second electrode plate more compact in the bending region, and reduces the occurrence of lithium plating.

In some embodiments, the first electrode plate is a negative electrode plate, and the second electrode plate is a positive electrode plate.

In the above solution, the first electrode plate and the second electrode plate are the negative electrode plate and the positive electrode plate respectively. Since the first segment of the first electrode plate exceeds the winding starting end of the second electrode plate, and the second electrode plate does not have a part corresponding to the first segment, making the first segment be the part where the first electrode plate is not intercalated with lithium, and the first segment is not prone to the occurrence of lithium plating. In addition, the part of the first electrode plate in the bending region and located at the outer side of the first segment can be supported by the first segment, so that the radius of curvature of this part is increased, which reduces the risk of lithium plating resulting from the powder removal of the innermost circle of the lithium-intercalated part of the first electrode plate in the bending region (the active material layer falls off) caused by the too small radius of curvature.

In some embodiments, both surfaces of the first segment are coated with a negative active material layer.

In the above solution, both surfaces of the first segment are coated with negative active material layers, so that the overall thickness of the first segment is thicker, which improves the support capacity of the first segment.

In a second aspect, an embodiment of the present application provides a battery cell, including a shell and the electrode assembly according to any one of the embodiments of the first aspect; and the electrode assembly being accommodated in the shell.

In the above solution, the first segment of the first electrode plate in the electrode assembly can provide a support force for the part of the first electrode plate and the second electrode plate in the bending region and located at the outer side of the first segment, making a structure of the part of the first electrode plate and the second electrode plate in the bending region more compact. And a gap between the part of the first electrode plate in the bending region and the part of the second electrode plate in the bending region is not easy to be expanded by an external force and the occurrence of lithium plating is reduced, the safety of the battery cell is improved, and the service life of the battery cell is extended.

In a third aspect, an embodiment of the present application provides a battery, including a box body, and the battery cell according to any one of the embodiments of the second aspect; and the battery cell being accommodated in the box body.

In a fourth aspect, an embodiment of the present application provides a power consumption device, including the battery according to any one of the embodiments of the third aspect.

In a fifth aspect, an embodiment of the present application provides a manufacturing method for an electrode assembly, including:

providing a first electrode plate and a the second electrode plate; winding the first electrode plate and the second electrode plate in a winding direction to form a winding structure, the winding structure including a bending region; where the first electrode plate includes a first segment that exceeds a winding starting end of the first electrode plate, and at least a part of the first segment is configured to provide a support force to a part of the first electrode plate and the second electrode plate in the bending region and located at an outer side of the first segment.

In a sixth aspect, an embodiment of the present application provides a manufacturing device for an electrode assembly, including a first providing apparatus, a second providing apparatus, and an assembling apparatus; the first providing apparatus is configured to provide a first electrode plate; the second providing apparatus is configured to provide a second electrode plate; and the assembling apparatus is configured to wind the first electrode plate and the second electrode plate in a winding direction to form a winding structure, the winding structure including a bending region; where the first electrode plate includes a first segment that exceeds a winding starting end of the first electrode plate, and at least a part of the first segment is configured to provide a support force to a part of the first electrode plate and the second electrode plate in the bending region and located at an outer side of the first segment.

BRIEF DESCRIPTION OF DRAWINGS

To describe the technical solutions in embodiments of the present application more clearly, the following briefly describes the accompanying drawings required for the embodiments. Apparently, the accompanying drawings in the following description show merely some embodiments of the present application, and persons of ordinary skill in the art may still derive other drawings from these accompanying drawings without creative efforts.

Figure 1:
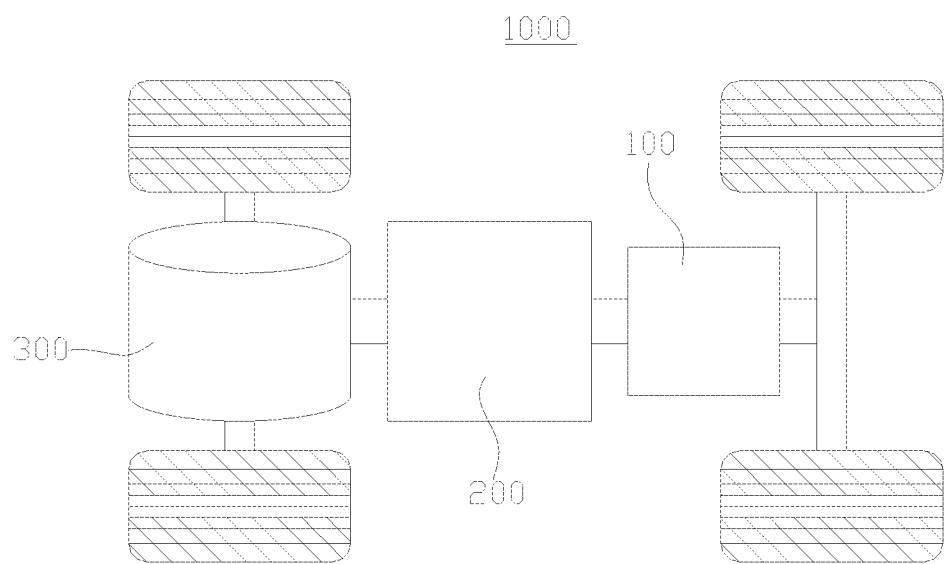
FIG. 1 is a schematic structural diagram of a vehicle according to some embodiments of the present application.

In the drawings, the drawings are not drawn to actual scale.

Description of signs: 10—box body; 11—accommodating portion; 12—covering portion; 13—sealed space; 20—battery cell; 21—shell; 211—housing; 212—cover; 213—sealing chamber; 22—electrode assembly; 221—first electrode plate; 2211—first segment; 2211a—bending portion; 2211b—first portion; 2212—second segment; 2212a—first subsegment; 2212b—second subsegment; 2212c—third subsegment; 2212d—fourth subsegment; 222—second electrode plate; 2221—second portion; 223—bending region; 224—straight region; 225a, 225b—winding starting end; 226a, 226b—winding finishing end; 227—separator; 228—negative active material layer; 229—positive active material layer; 30—battery module; 31—busbar component; 100—battery; 200—controller; 300—motor; 1000—vehicle; 2000—manufacturing device; 2100—first providing apparatus; 2200—second providing apparatus; 2300—assembly apparatus; A—winding direction; B—first direction; C—second direction; a—first junction; b—second junction; c—third junction; and d—fourth junction.

DESCRIPTION OF EMBODIMENTS

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least one embodiment of the present application. The phrase at various locations in the specification does not necessarily refer to the same embodiment, or an independent or alternate embodiment that is mutually exclusive from another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. A person of ordinary skill in the art may understand the specific meanings of the foregoing terms in the present application according to specific circumstances.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two).

In the present application, battery cells may include lithium-ion secondary batteries, lithium-ion primary batteries, lithium-sulfur batteries, sodium/lithium-ion batteries, sodium-ion batteries or magnesium-ion batteries, etc., which are not limited by the embodiments of the present application. The battery cells may be cylindrical, flat, cuboid or in another shape, which is not limited by the embodiments of the present application. The battery cells are generally divided into three types according to the way of packaging: cylindrical battery cells, prismatic battery cells and pouch battery cells, which are not limited by the embodiments of the present application.

The battery mentioned in the embodiment of the present application refers to a single physical module that includes one or more battery cells to provide a higher voltage and capacity. For example, the battery mentioned in the present application may include a battery module, a battery pack, or the like. The battery generally includes a box body for enclosing one or more battery cells. The box body may prevent liquid or other foreign matters from affecting the charging or discharging of the battery cell.

The battery cell includes an electrode assembly and an electrolyte solution, and the electrode assembly is composed of a positive electrode plate, a negative electrode plate, and a separator. The operation of the battery cell mainly relies on the movement of metal ions between the positive electrode plate and the negative electrode plate. The positive electrode plate includes a positive electrode current collector and a positive active material layer. The positive active material layer is coated on a surface of the positive electrode current collector, and the positive electrode current collector not coated with the positive active material layer protrudes from the positive electrode current collector coated with the positive active material layer and is used as a positive electrode tab. As an example, in a lithium-ion battery, the material of the positive electrode current collector may be aluminum, and the positive active material may be lithium cobalt oxides, lithium iron phosphate, ternary lithium or lithium manganate, or the like. The negative electrode plate includes a negative electrode current collector and a negative active material layer. The negative active material layer is coated on a surface of the negative electrode current collector, and the negative electrode current collector not coated with the negative active material layer protrudes from the negative electrode current collector coated with the negative active material layer and is used as a negative electrode tab. The material of the negative electrode current collector may be copper, and the negative active material may be carbon or silicon, and like. In order to ensure that no fusing occurs when a large current passes, the number of positive tabs is multiple, the multiple positive electrode tabs are stacked together, the number of negative tabs is multiple and the multiple negative electrode tabs are stacked together. A material of the separator may be PP (polypropylene) or PE (polyethylene), or the like.

For lithium-ion batteries, during charging, lithium-ions are deintercalating from the positive electrode and intercalated into the negative electrode during discharging, lithium-ions are deintercalating from the negative electrode and intercalated into the positive electrode. When charging lithium-ion batteries, a number of abnormalities may occur which may lead to lithium plating. For example, the phenomenon of lithium plating is caused by abnormalities such as insufficient space for lithium to be intercalated in the negative electrode, excessive resistance to lithium-ion migration, or lithium-ions detaching from the positive electrode too quickly but not being able to be intercalated in the negative electrode in equal quantities, which means that lithium-ions that cannot be intercalated in the negative electrode can only gain electrons on the surface of the negative electrode, resulting in the formation of elementary substance lithium.

The applicant found that the electrode assembly is prone to lithium plating in the bending region. After further study, it is found that after the first electrode plate and the second electrode plate are wound into a winding structure by a winding needle, during pulling out the winding needle at a winding core position, the electrode plate in contact with the winding needle is displaced under the drive of the winding needle, which increases a gap between a part of the first electrode plate in the bending region and the part of the second electrode plate in the bending region, and the lithium plating is likely to occur during charging.

In view of this, in a technical solution provided by an embodiment of the present application, by providing a support force to the part of the first electrode plate and the second electrode plate in the bending region and located at the outer side of the first segment through the first segment that exceeds the winding starting end of the second electrode plate, so that the structure of the part of the first electrode plate and the second electrode plate in the bending region is more compact. And a gap between the part of the first electrode plate in the bending region and the part of the second electrode plate in the bending region is not easy to be expanded by an external force and the occurrence of lithium plating is reduced.

The technical solution described in the embodiment of the present application is applicable to a battery and a power consumption device using the battery.

The power consumption device provided by an embodiment of the present application may be vehicles, mobile phones, portable devices, notebook computers, ships, spacecraft, electric toys, electric tools, or the like. The vehicle can be fuel vehicles, gas vehicles or new energy vehicles; new energy vehicles can be pure electric vehicles, hybrid vehicles or extended range vehicles, etc; the spacecrafts include airplanes, rockets, space shuttles and spaceships, or the like; the electric toys include fixed or mobile electric toys, such as game consoles, electric vehicle toys, electric ship toys and electric airplane toys, or the like; the electric tools include metal cutting power tools, grinding power tools, assembly power tools and railway power tools, such as electric drills, electric grinders, electric wrenches, electric screwdrivers, electric hammers, impact drills, concrete vibrators, and electric planers, or the like. The embodiment of the present application does not impose special restrictions on the above power consumption devices.

For the convenience of description, the following embodiments take a vehicle as an example of the power consumption device for description.

Please refer to FIG. 1. FIG. 1 is a schematic structural diagram of a vehicle 1000 provided by some embodiments of the present application. A battery 100 is provided inside the vehicle 1000, and the battery 100 may be provided at the bottom, head, or tail of the vehicle 1000. The battery 100 may be used for power supply of the vehicle 1000, for example, the battery 100 may be used as an operating power source of the vehicle 1000.

The vehicle 1000 further includes a controller 200 and a motor 300. The controller 200 is configured to control the battery 100 to supply power to the motor 300, for example, for starting, navigating, and working power requirements during driving of the vehicle 1000.

In some embodiments of the present application, the battery 100 may serve not only as an operation power source of the vehicle 1000, but also as a driving power source of the vehicle 1000, replacing or partially replacing fuel or natural gas to provide driving power for the vehicle 1000.

Figure 2:
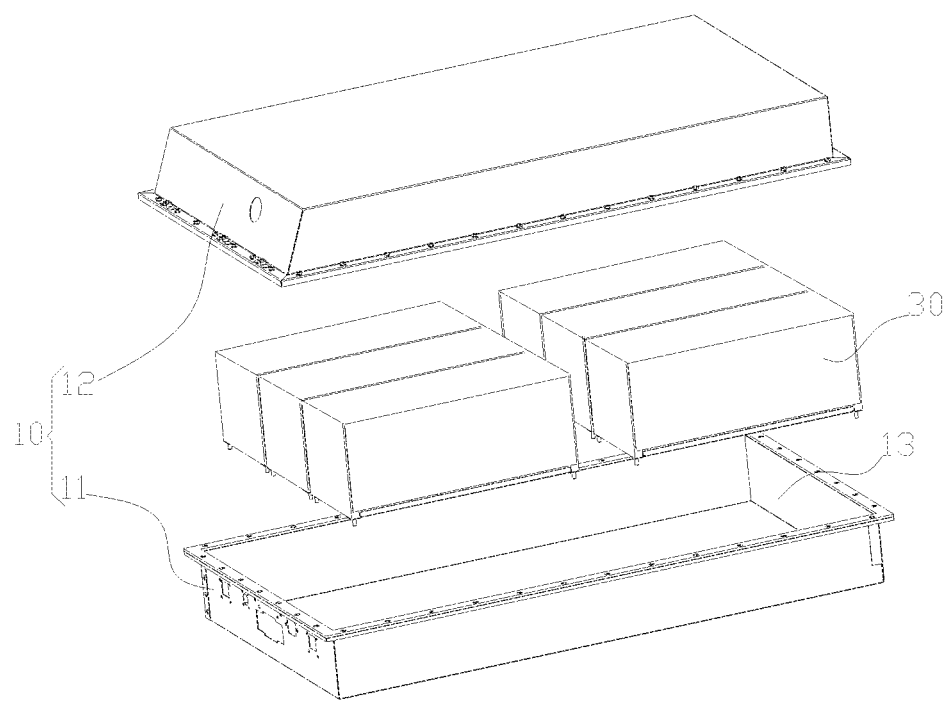
FIG. 2 is a schematic structural diagram of a battery according to some embodiments of the present application.

Please refer to FIG. 2. FIG. 2 is an exploded view of a battery 100 according to some embodiments of the present application. The battery 100 provided by the embodiment of the present application includes a box body 10 and a battery cell 20 (not shown in FIG. 2), and the battery cell 20 is accommodated in the box body 10.

The box body 10 is configured to accommodate the battery cell 20 to provide a sealed environment for the battery cell 20. In some embodiments, the box body 10 may include an accommodating portion 11 and a covering portion 12, the accommodating portion 11 is covered with the covering portion 12, the accommodating portion 11 and the covering portion 12 together define a sealed space 13 configured to accommodate the battery cell 20. The accommodating portion 11 and the covering portion 12 may both be hollow structures with one side open, and the opening side of the accommodating part 11 covers the opening side of the covering portion 12 to form the box body 10 with the sealed space 13. Of course, the accommodating portion 11 and the covering portion 12 may have various shapes, such as a cylinder, a cuboid, and the like.

In the battery 100, the battery cell 20 may be one, or more. If there are a plurality of battery cells 20, the plurality of battery cells 20 can be connected in series or in parallel or in hybrid. The hybrid connection means that a plurality of battery cells 20 are both connected in series and in parallel. The plurality of battery cells 20 can be directly connected in series or in parallel or in hybrid, and then a whole formed by a plurality of battery cells 20 can be accommodated in the box body 10. Of course, it may further be that a plurality of battery cells 20 are first connected in series, or in parallel or in hybrid to form a battery module 30; a plurality of battery modules 30 are then connected in series or in parallel or in hybrid to form as a whole, and are accommodated inside the box body 10.

Figure 3:
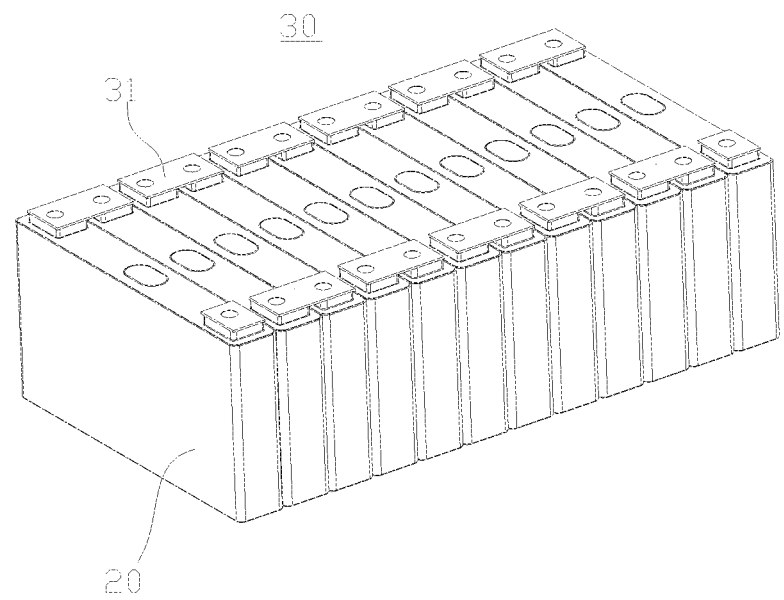
FIG. 3 is a schematic structural diagram of a battery module of the battery shown in FIG. 2.

In some embodiments, please refer to FIG. 3. FIG. 3 is a schematic structural diagram of a battery module 30 of the battery 100 shown in FIG. 2. There are a plurality of battery cells 20 and a plurality of battery cells 20 are first connected in series, or connected in parallel or in hybrid to form the battery module 30. A plurality of battery modules 30 are then connected in series, or in parallel or in series to form as a whole, and are accommodated in the box body 10.

Figure 4:
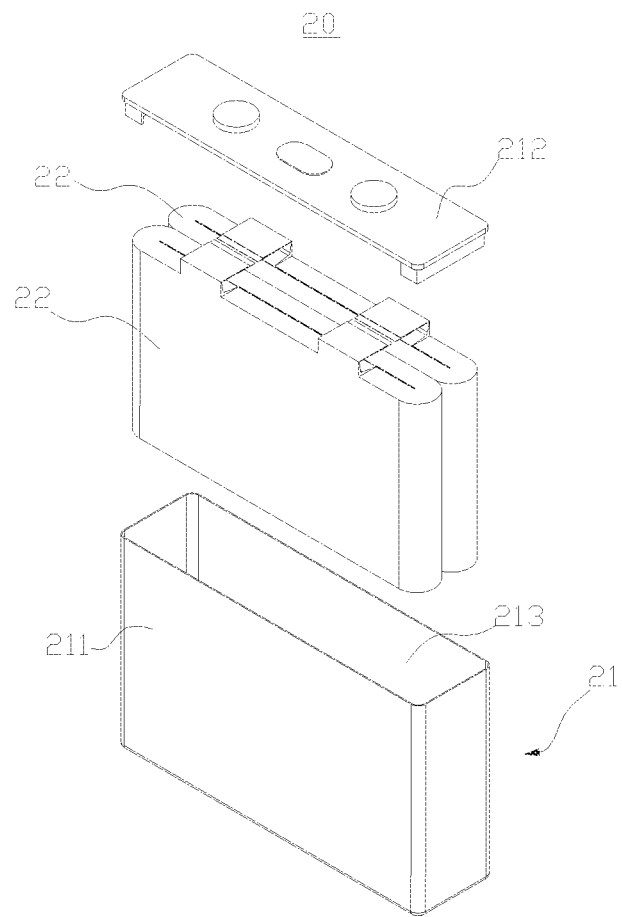
FIG. 4 is an exploded view of a battery cell of the battery module shown in FIG. 3.

In some embodiments, the plurality of battery cells 20 in the battery module 30 may be electrically connected through the busbar component 31 to realize the parallel connection, series connection, or hybrid connection of the plurality of battery cells 20 in the battery module 30, Please refer to FIG. 4. FIG. 4 is an exploded view of the battery cell 20 of the battery module 30 shown in FIG. 3. The battery cell 20 provided by the embodiment of the present application includes a shell 21 and an electrode assembly 22, and the electrode assembly 22 is accommodated in the shell 21.

The shell 21 can provide a sealed environment for the electrode assembly 22, and the shell 21 is filled with electrolyte, such as electrolyte solution.

It should be noted that in the battery cell 20, the electrode assembly 22 accommodated in the shell 21 may be one, or more. Exemplarily, in FIG. 4, there are two electrode assemblies 22.

In some embodiments, please continue to refer to FIG. 4, the shell 21 may include a housing 211 and a cover 212. The housing 211 is a hollow structure with one side open. The cover 212 covers the opening of the housing 211 and forms a sealed connection to form the sealed space 213 for accommodating the electrode assembly 22 and the electrolyte. When the battery cell 20 is assembled, the electrode assembly 22 can be put into the housing 211 first, and the housing 211 is filled with the electrolyte, and then the cover 212 covers the opening of the housing 211.

The housing 211 may have various shapes, such as a cylinder, a cuboid, or the like. The shape of the housing 211 may be determined according to a specific shape of the electrode assembly 22. For example, if the electrode assembly 22 has a cylindrical structure, the housing 211 can be selected as a cylindrical shell 21; if the electrode assembly 22 has a cuboid structure, the housing 211 can be selected as a cuboid shell 21. Of course, the cover 212 may also have various structures, for example, the cover 212 has a plate-shaped structure, a hollow structure with one end open, or the like. Exemplarily, in FIG. 4, the housing 211 has a cuboid structure, the cover 212 has a plate-shaped structure, and the cover 212 covers the opening at the top of the housing 211.

Figure 5:
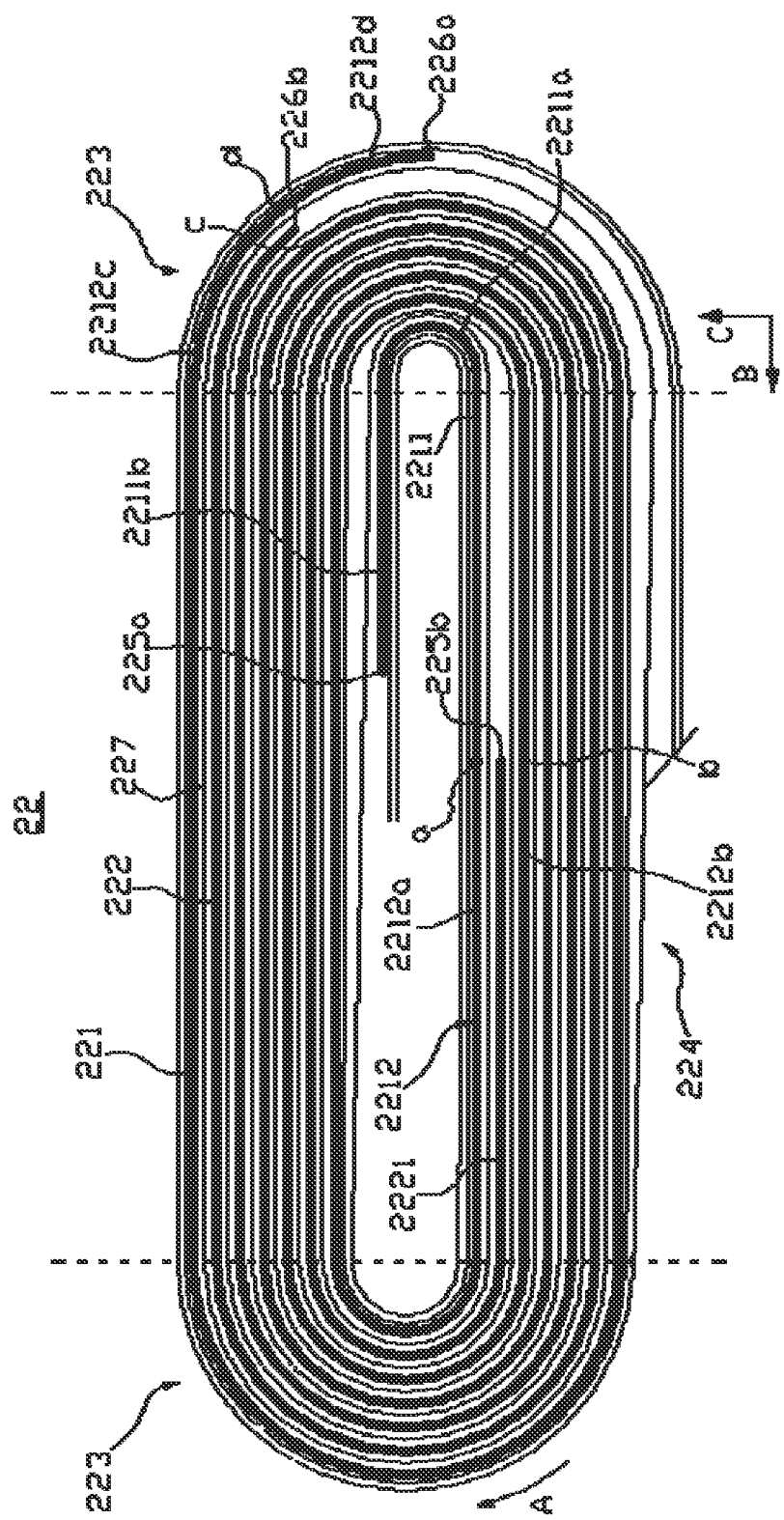
FIG. 5 is a schematic structural diagram of an electrode assembly according to some embodiments of the present application.

Please refer to FIG. 5. FIG. 5 is a schematic structural diagram of an electrode assembly 22 according to some embodiments of the present application. The electrode assembly 22 provided by an embodiment of the present application includes a first electrode plate 221 and a second electrode plate 222, wherein the first electrode plate 221 and the second electrode plate 222 are wound in a winding direction A to form a winding structure, and the winding structure includes a bending region 223; and the first electrode plate 221 includes a first segment 2211 that exceeds a winding starting end 225b of the second electrode plate 222, and at least a part of the first segment 2211 is configured to provide a support force to a part of the first electrode plate 221 and the second electrode plate 222 in the bending region 223 and located at an outer side the first segment 2211.

The first segment 2211 can provide a support force to a part of the first electrode plate 221 and the second electrode plate 222 in the bending region 223 and located at an outer side of the first segment 2211, making a structure of the part of the first electrode plate 221 and the second electrode plate 222 in the bending region 223 more compact. And a gap between the part of the first electrode plate 221 in the bending region 223 and the part of the second electrode plate 222 in the bending region 223 is not easy to be expanded by an external force; and the electrode plate in contact with the winding needle is not easy to be displaced under the drive of the winding needle, which reduces the occurrence of lithium plating.

It should be noted that the winding direction A is the direction in which the first electrode plate 221 and the second electrode plate 222 are wound circumferentially from the inside to the outside from the winding starting end 225b. In FIG. 5, the winding direction A is a clockwise direction.

The first electrode plate 221 has two ends, respectively the winding starting end 225a and the winding finishing end 226a; the winding starting end 225a of the first electrode plate 221 is a feeding end of the first electrode plate 221, that is, a free end of the first electrode plate 221 at its innermost circle; the winding finishing end 226a of the first electrode plate 221 is a free end of the first electrode plate 221 at its outermost side. The second electrode plate 222 also has two ends, respectively the winding starting end 225b and the winding finishing end 226b; the winding starting end 225b of the second electrode plate 222 is a feeding end of the second electrode plate 222, that is, a free end of the second electrode plate 222 at its innermost circle; the winding finishing end 226b of the second electrode plate 222 is a free end of the second electrode plate 277 at its outermost side.

The winding structure further includes a straight region 224, and both ends of the straight region 224 are provided with bending regions 223. The two bending regions 223 are located at two ends of the straight region 224 in a first direction B. The straight region 224 is the region where the winding structure has a flat structure. The part of the first electrode plate 221 located in the straight region 224 and the part of the second electrode plate 222 located in the straight region 224 are substantially arranged along the first direction B. The bending region 223 is the region where the winding structure has a bending structure. The part of the first electrode plate 221 located in the bending region 223 and the part of the second electrode plate 222 located in the bending region 223 are bent and distributed. Exemplarily, the part of the first electrode plate 221 located in the bending region 223 and the part of the second electrode plate 222 located in the bending region 223 are arc-shaped.

The electrode assembly 22 may further include a separator 227, and the separator 227 isolates the first electrode plate 221 from the second electrode plate 222. The separator 227 has an insulating property, and reduces the risk of short circuit between the first electrode plate 221 and the second electrode plate 222. A material of the separator 227 may be PP (polypropylene) or PE (polyethylene), and the like.

Figure 6:
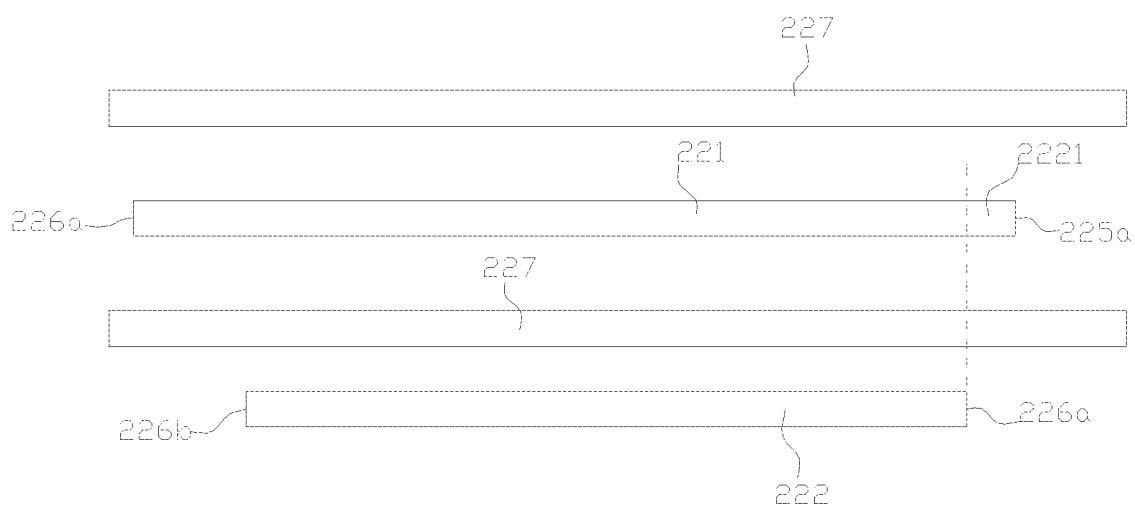
FIG. 6 is a schematic structure diagram of the electrode assembly being unfold shown in FIG. 5.

In some embodiments, please refer to FIG. 6. FIG. 6 a schematic structure diagram of the electrode assembly 22 being unfold shown in FIG. 5. The electrode assembly 22 may include two separators 227, where a separator 227, a first electrode plate 221, another separator 227, and a second electrode plate 222 are stacked in sequence, and the four are stacked are wound along the winding direction A (refer to FIG. 5) and can form a winding structure.

In the embodiment of the present application, the polarities of the first electrode plate 221 and the second electrode plate 222 are opposite. The first electrode plate 221 may be a negative electrode plate, and the second electrode plate 222 is a positive electrode plate; or the first electrode plate 221 may be a positive electrode plate, and the second electrode plate 222 is a negative electrode plate. If the first electrode plate 221 is a positive electrode plate and the second electrode plate 222 is a negative electrode plate, the first segment 2211 of the first electrode plate 221 may not be coated with the positive electrode active material layer 229 on both surfaces, that is, the first segment 2211 of the first electrode plate 221 only have a positive current collector and have no positive electrode active material layer 229, which reduces the occurrence of lithium plating. If the first electrode plate 221 is a negative electrode plate and the second pole piece 222 is a positive electrode plate, the first segment 2211 of the first electrode plate 211 may not be coated with the negative electrode active material layers 228 on both surfaces, or at least one surface may be coated with a negative active material layer 228, that is, the first segment 2211 of the first electrode plate 211 may only have a negative electrode current collector, or may include a negative electrode current collector and a negative active material layer 228 coated on the negative electrode current collector.

Figure 7:
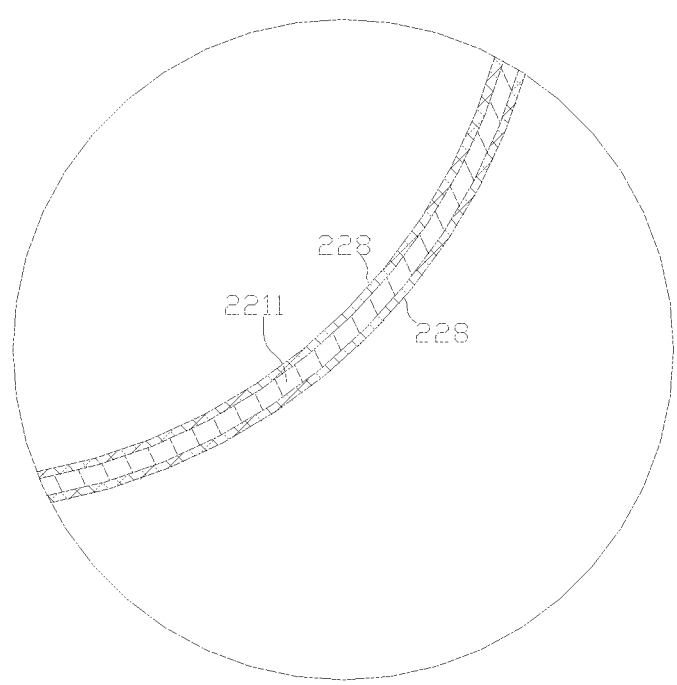
FIG. 7 is a partially enlarged view of a first segment of a first electrode plate shown in FIG. 5.

In other embodiments, the first electrode plate 221 is a negative electrode plate, and the second electrode plate 222 is a positive electrode plate. Please refer to FIG. 7. FIG. 7 is a partially enlarged view of a first segment 2211 of a first electrode plate 221 shown in FIG. 5. Both surfaces of the first segment 221 of the first electrode plate 221 are coated with negative active material layers 228, so that the overall thickness of the first segment 2211 is thicker, which improves the support capacity of the first segment 2211.

For a general electrode assembly 22, the electrode plate at the innermost side of the electrode assembly 22 in the bending region 223 is generally the most bent, that is, the radius of curvature of the electrode plate at innermost side in the bending region 22.3 is the smallest, and the chance of the powder removal (the active material layer falls off) is the greatest. If the electrode plate at the innermost side is a negative electrode plate, there is prone to a risk of lithium plating.

In the present embodiment, since the first electrode plate 221 is a negative electrode plate, and the first segment 2211 of the first electrode plate 221 exceeds the winding starting end 225a of the second segment 222, and at least a part of the first segment 2211 is located in the bending region 223 and provides a support force to the first electrode plate 221 and the second electrode plate 222 at its outer side, the electrode plate of the electrode assembly 22 at the innermost side of the bending region 223 is the first segment 2211, and the second electrode plate 222 does not have a part corresponding to the first segment 2211, the first segment 2211 is a part of the first electrode plate where no lithium is intercalated. Even if the radius of curvature of the part of the first segment 2211 in the bending region 223 is too small and causes the powder removal, the lithium plating is not likely to occur. In addition, the part of the first electrode plate 221 in the bending region 223 and located at the outer side of the first segment 2211 can be supported by the first segment 2211, so that the radius of curvature of this part is increased, which reduces the risk of lithium plating resulting from the powder removal of the innermost circle of the lithium-intercalated part of the first electrode plate 221 in the bending region 223 (the active material layer falls off) caused by the too small radius of curvature.

In some embodiments, please continue to refer to FIG. 5, the first electrode plate 221 further includes a second segment 2212 continuously arranged with the first segment 2211 along the winding direction A, a junction (a first junction a) of the first segment 2211 and the second segment 2212 is located at an inner side of the winding starting end 225b of the second electrode plate 222. At least a part of the first segment 2211 is supported at an inner side of the second segment 2212 in the bending region 223.

The support force provided by the part of the first segment 2211 in the bending region 223 can be first transmitted to the second segment 2212, and then to the second electrode plate 222 through the second segment 2212, so that the first segment 2211 can produce better support to the part of the first electrode plate 221 in the bending region 223 and the part of the second electrode plate 222 in the bending region 223.

The second segment 2212 is the part of the first electrode plate 221 where lithium is intercalated. When charging, lithium-ions are deintercalated from the second electrode plate 222 and intercalated in the second segment 2212. When discharging, lithium-ions are deintercalated from the second segment 2212 and intercalated in the second electrode plate 222.

For a general electrode assembly 22, a feeding start end of the first electrode plate 221 is located in the straight region 224, and the first electrode plate 221, the second electrode plate 222 and the separator 227 are wound into a winding structure by a winding needle. After the winding structure is wound, there is friction between the winding needle and the first electrode plate 221. In the process of pulling out the winding needle at the position of a winding core of the winding structure, the winding needle drives a part of the second segment 2212 located at the innermost side of the bending region 223 to displace, and causes the gap between the part of the second segment 2212 at the innermost side of the bending region 223 and the second electrode plate 222 to increase, and the phenomenon of lithium plating is likely to occur during charging.

In this embodiment, at least a part of the first segment 2211 is supported at an inner side of the second segment 2212 in the bending region 223. In the process of pulling out the winding needle, the winding needle cannot easily drive the innermost part of the second segment 2212 in the bending region 223 to displace, which reduces the occurrence of lithium plating.

It should be noted that at least a part of the first segment 2211 is supported at the inner side of the second segment 2212 in the bending region 223. The part of the first segment 2211 in the bending region 223 may directly contact the second segment 2212 to support at the inner side of the second segment 2212. Or the part of the first segment 2211 located in the bending region 223 is supported at the inner side of the second segment 2212 through the separator 227. The part of the first segment 2211 in the bending region 223 can be isolated from the part of the second segment 2212 in the bending region 223 through the separator 227. The part of the first segment 2211 in the bending region 223 is in contact with the separator 227, and the separator 227 is in contact with the second segment 2212. The supporting force provided by the first segment 2211 in the bending region 223 can be transmitted to the second segment 2212 through the separator 227.

Exemplarily, in FIG. 5, the part of the first segment 2211 located in the bending region 223 is supported at the inner side of the second segment 2212 by the separator 227. The separator 227 exceeds the winding starting end 225a of the first electrode plate 221, and the part of the separator 227 that exceeds the winding starting end 225a of the first electrode plate 221 is wound toward the inner side of the first segment 2211.

In some embodiments, please continue to refer to FIG. 5, the second segment 2212 includes a first subsegment 2212a continuously arranged with the first segment 2211 along the winding direction A, that is, the first subsegment 2212a borders the first segment 2211. Only one surface of the first subsegment 2212a is opposite to the active material layer of the second electrode plate 222, the first subsegment 2212a is wound one circle outward along the winding direction from the junction; and the first segment 2211 includes a bending portion 2211a bent and arranged in the bending region 223, and the bending portion 2211a is supported at the first subsegment 2212a in the bending region 223. The bending portion 2211a is in a bending state in the bending region 223, and can produce a good support effect for the first subsegment 2212a.

Here, the junction between the first subsegment 2212a and the first segment 2211 is a first junction a. The part of the first segment 2211 located in the bending region 223 is the bending portion 2211a. Exemplarily, the bending portion 2211a is arc-shaped.

Since the first junction a is located at the inner side of the winding starting end 225b of the second electrode plate 222, there is no second electrode plate 222 at the inner side of the first subsegment 2212a, only one surface of the first subsegment 2212a is opposite to the active material layer of the second electrode plate 222. That is, an inner surface of the first subsegment 2212a is not opposite to the active material layer of the second electrode plate 222, and an outer surface of the first subsegment 2212a is opposite to the active material layer of the second electrode plate 222 located at and adjacent to its outer side.

Figure 8:
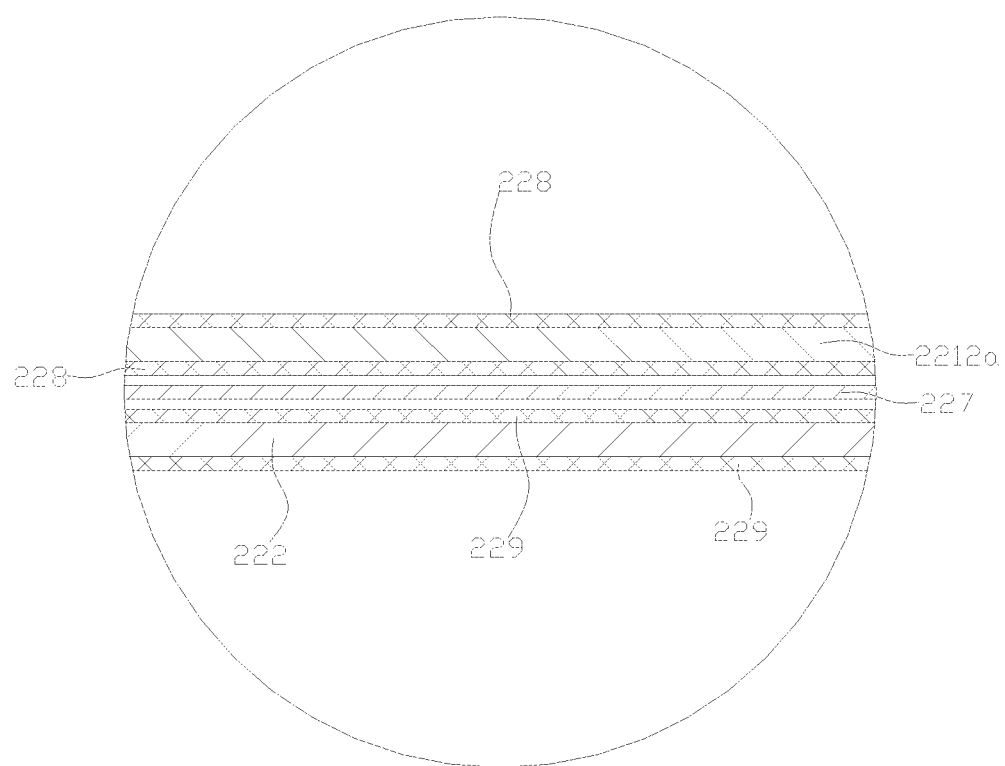
FIG. 8 is a partially enlarged view of a first subsegment of a first electrode plate and a second electrode plate shown in FIG. 5.
Figure 9:
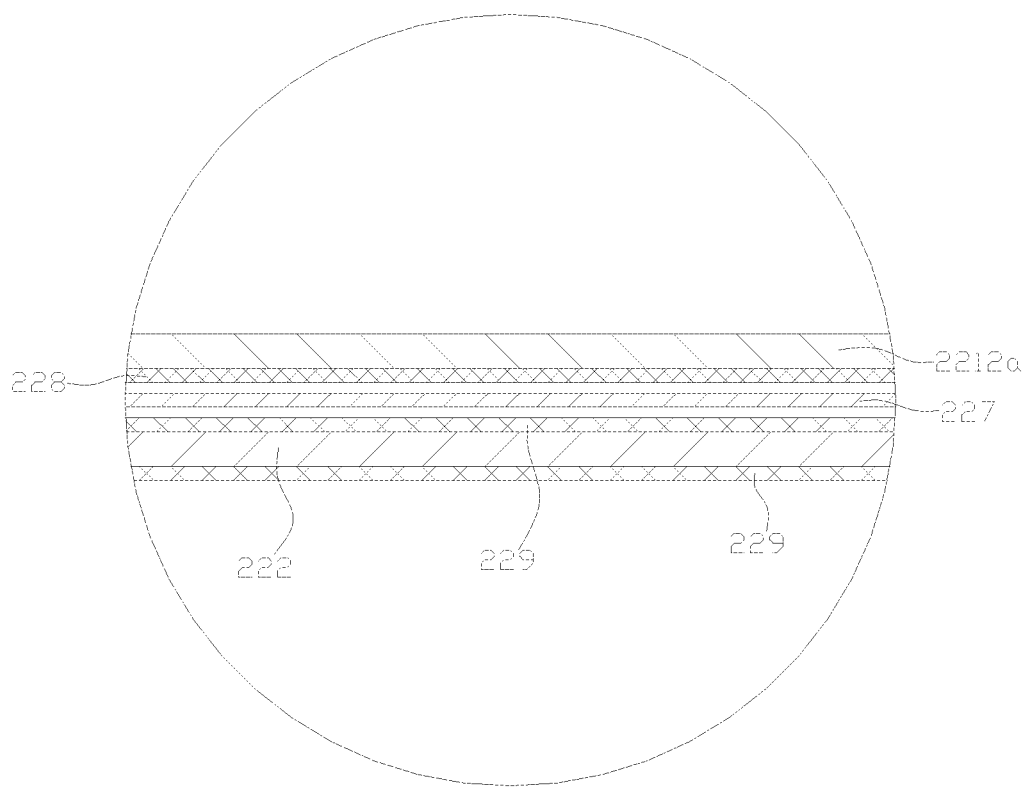
FIG. 9 is a partially enlarged view of the first subsegment of the first electrode plate and the second electrode plate provided by other embodiments of the present application.

The active material layer of the first subsegment 2212a can be arranged in various forms. For example, please refer to FIG. 8. FIG. 8 is a partial enlarged view of the first subsegment 2212a and the second electrode plate 222 of the first electrode plate 221 shown in FIG. 5. It may be that both surfaces of the first subsegment 2212a are coated with active material layers. The active material layer may be the negative active material layer 228, which can simplify the production process of the first electrode plate 221 and facilitate the formation of the first electrode plate 221. Please refer to FIG. 9. FIG. 9 is a partial enlarged view of the first subsegment 2212a of the first electrode plate 221 and the second electrode plate 222 provided by still other embodiments of the application. One surface of the first subsegment 2212a opposite to the second electrode plate 222 may further be coated with the active material layer. The active material layer on the first subsegment 2212a may be the negative active material layer 228, and the active material layer on the second electrode plate 222 may be the positive active material layer 229. The other surface of the first subsegment 2212a is not coated with the active material layer, which can reduce the amount of the active material layer on the first electrode plate 221 and reduce the production cost of the first electrode plate 221.

During the charging and discharging process, lithium is deintercalated between the active material layer on the inner surface of the first subsegment 2212a and the active material layer of the second electrode plate 222.

Exemplarily, the active material layer on the first electrode plate 221 is the negative active material layer 228, and the active material layer at the outer surface of the first subsegment 2212a is the negative active material layer 228; and the active material layer on the second electrode plate 222 is the positive active material layer 229. The entire segment of the second electrode plate 222 from the winding starting end 225b to the winding finishing end 226b is coated with a positive active material layer 279 on both surfaces.

In some embodiments, please continue to refer to FIG. 5, the second segment 2212 may further include a second subsegment 2212b and a third subsegment 2212c. The first segment 2211, the first subsegment 2212a, the second subsegment 2212b, and the third subsegment 2212c are successively arranged along the winding direction A; both surfaces of the second subsegment 2212b are opposite to the active material layer of the second electrode plate 222; and only one surface of the third subsegment 2212c is opposite to the active material layer of the second electrode plate 222.

Here, the second subsegment 2212b borders the first subsegment 2212a, and the third subsegment 2212c borders the second subsegment 2212b. The junction between the second subsegment 2212b and the first subsegment 2212a is a second junction b, and the junction between the third subsegment 2212c and the second subsegment 2212b is a third junction c. Since the first subsegment 2212a is wound one lap outward along the winding direction A from its junction with the first segment 2211, the second junction b is located at the outer side of the first junction a.

Both surfaces of the second subsegment 2212b are coated with active material layers. Both surfaces of the second subsegment 2212b are opposite to the active material layer of the second electrode plate 222, that is, the active material layer coated on the inner surface side of the second subsegment 2212b is opposite to the active material layer of the second electrode plate 222 located at and adjacent to its inner side. The active material layer coated on the outer surface of the second subsegment 2212b is opposite to the active material layer of the second electrode plate 222 located and adjacent to its outer side. During the charging and discharging process, lithium is deintercalated between the active material layer coated on the inner surface of the second subsegment 2212b and the active material layer of the second electrode plate 222 located at and adjacent to its inner side; and lithium is deintercalated between the active material layer coated on the outer surface of the second subsegment 2212b and the active material layer of the second electrode plate 222 located at and adjacent to its outer side.

Only one surface of the third subsegment 2212c is opposite to the active material layer of the second electrode plate 222, that is, an outer surface of the third subsegment 2212c is not opposite to the active material layer of the second electrode plate 222, and the outer surface of the third subsegment 2212c is opposite to the active material layer of the second electrode plate 222 located at and adjacent to its inner side. Exemplarily, as shown in FIG. 5, the second electrode plate 222 is not provided at the outer side of the third subsegment 2212c, so that the outer surface of the third subsegment 2212c is not opposite to the active material layer of the second electrode plate 222.

Figure 10:
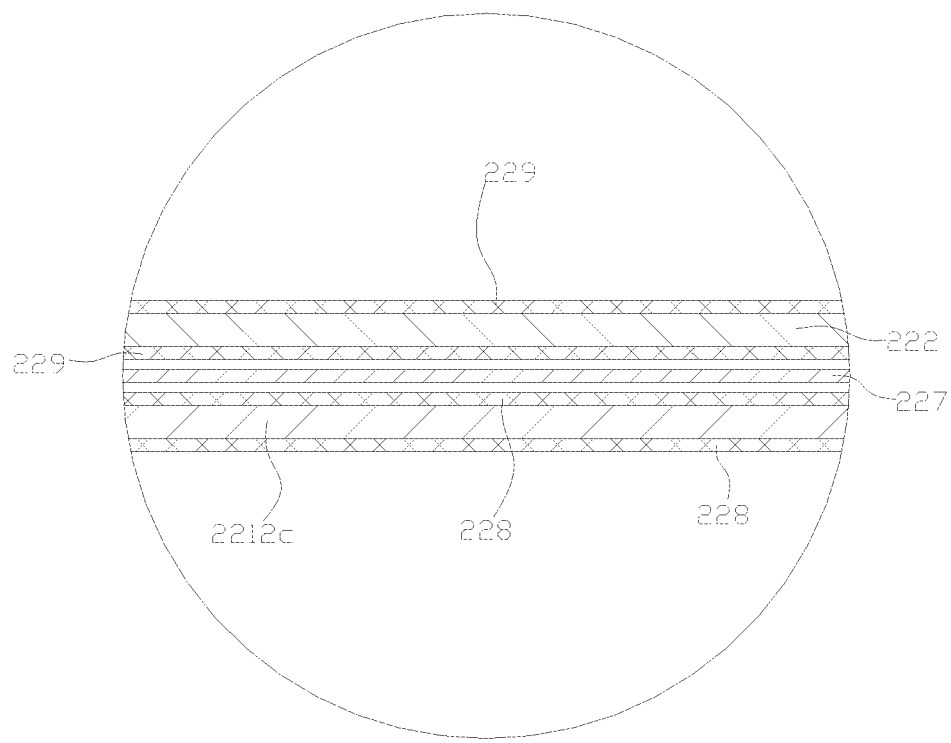
FIG. 10 is a partially enlarged view of a third subsegment of the first electrode plate and the second electrode plate shown in FIG. 5.
Figure 11:
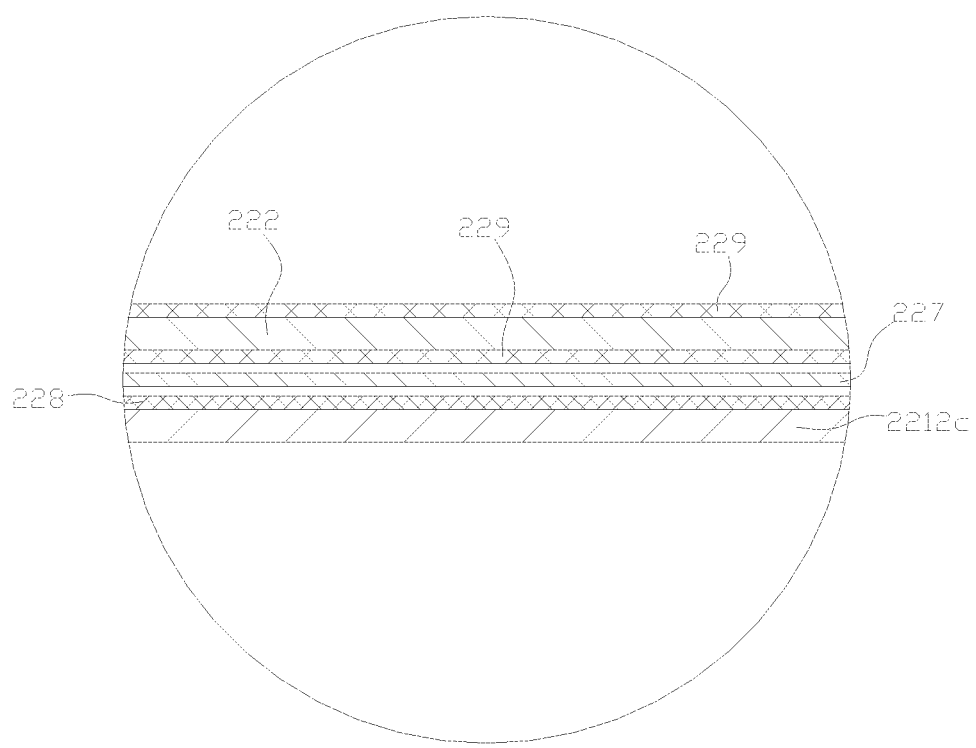
FIG. 11 is a partially enlarged view of a third subsegment of the first electrode plate and the second electrode plate provided by other embodiments of the present application.

The active material layer of the third subsegment 2212c can be arranged in various forms, For example, please refer to FIG. 10. FIG. 10 is a partially enlarged view of a third subsegment 222c of the first electrode plate 221 and the second electrode plate 222 shown in FIG. 5. It may be that both surfaces of the third subsegment 2212c are coated with active material layers, and the active material layers may be the negative active material layer 228. Please refer to FIG. 11. FIG. 11 is a partial enlarged view of the third subsegment 2212c of the first electrode plate 221 and the second electrode plate 222 provided by still other embodiments of the application. One surface of the third subsegment 2212c opposite to the second electrode plate 222 may further be coated with the active material layer. The active material layer on the third subsegment 2212c may be the negative active material layer 228, and the active material layer on the second electrode plate 222 may be the positive active material layer 229. The other surface of the third subsegment 2212c is not coated with the active material layer.

In some embodiments, please continue to refer to FIG. 5, the second segment 2212 may further include a fourth subsegment 2212d, where a first segment 2211, a first subsegment 2212a, a second subsegment 2212b, a third subsegment 2212c, and a fourth subsegment 2212d are continuously arranged along the winding direction A in sequence, and both surfaces of the fourth subsegment 2212d are not opposite to the active material layer of the second electrode plate 222.

Here, the fourth subsegment 2212d borders the third subsegment 2212c, and the junction between the fourth subsegment 2212d and the third subsegment 2212c is a fourth junction d.

Both surfaces of the fourth subsegment 2212d are not opposed to the active material layer of the second electrode plate 222, that is, an inner and outer surfaces of the fourth subsegment 2212d are not opposed to the active material layer of the second electrode plate 222. Exemplarily, the fourth subsegment 2212d exceeds the winding finishing end 226b of the second electrode plate 222, so that neither surfaces of the fourth subsegment 2212d is opposite to the active material layer of the second electrode plate 222.

When the second electrode plate 222 is a negative electrode plate, it can effectively reduce the occurrence of lithium plating at a stop end portion of the first electrode plate 221 that setting the fourth subsegment 2212d exceeding the winding finishing end 226b of the second electrode plate 222.

Figure 12:
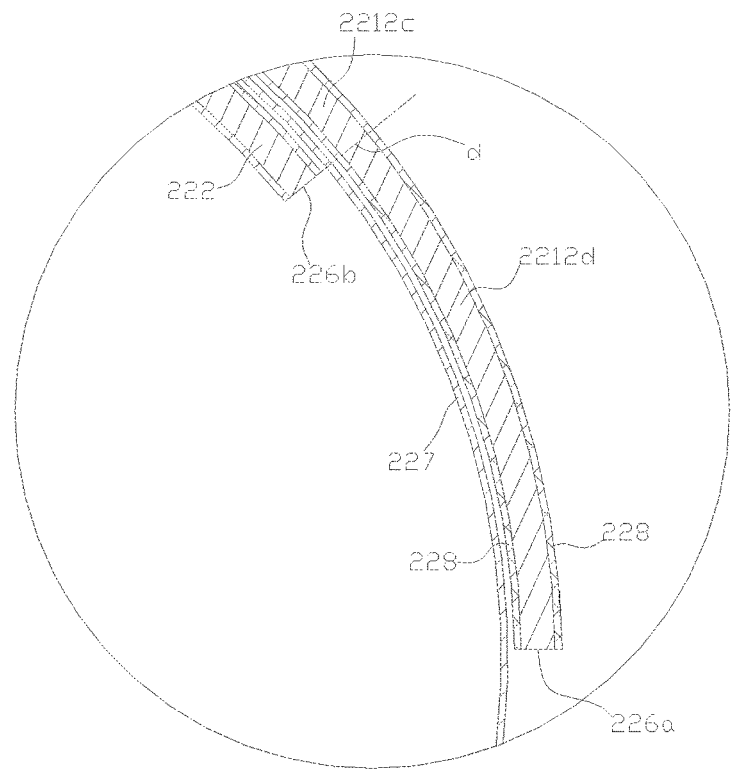
FIG. 12 is a partially enlarged view of a fourth subsegment of the first electrode plate and the second electrode plate shown in FIG. 5.
Figure 13:
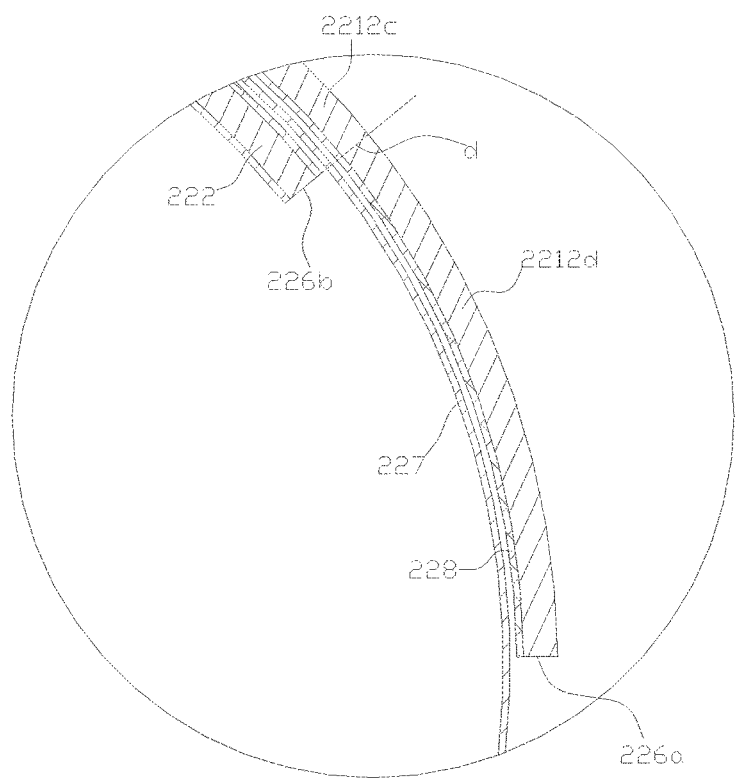
FIG. 13 is a partially enlarged view of the fourth subsegment of the first electrode plate and the second electrode plate provided by other embodiments of the present application.

The active material layer of the fourth subsegment 2212d can be arranged in various forms. For example, please refer to FIG. 12. FIG. 12 is a partially enlarged view of a fourth subsegment 2212d of the first electrode plate 221 and the second electrode plate 222 shown in FIG. 5. It may be that both surfaces of the fourth subsegment 222d are coated with active material layers, and the active material layers may be the negative active material layer 228. Please refer to FIG. 13. FIG. 13 is a partially enlarged view of the fourth subsegment 2212d of the first electrode plate 221 and the second electrode plate 222 provided by still other embodiments of the present application. The fourth subsegment 2212d is coated with an active material layer at its inner side. The other surface of the fourth subsegment 2212d is not coated with an active material layer. That is, the inner surface of the fourth subsegment 2212d is coated with an active material layer, and the outer surface of the fourth subsegment 2212d is not coated with an active material layer. The active material layer of the fourth subsegment 2212d may be the negative active material layer 228.

The fourth subsegment 2212d is an ending segment of the first electrode plate 221. The first electrode plate 221 may end in the bending region 223 or the straight region 224. That is, the fourth subsegment 2212d may be located in the bending region 223, or in the straight region 224. Exemplarily, in FIG. 5, the fourth subsegment 2212d is located in the bending region 223.

An end of the fourth subsegment 2212d away from the third subsegment 2212c is the winding finishing end 226a of the first electrode plate 221. The separator 227 may exceed the winding finishing end 226a of the first electrode plate 221 and be wound along the winding direction A for a certain distance.

Exemplarily, the value range of the length of the fourth subsegment 2212d may be 3 mm-15 mm.

Figure 14:
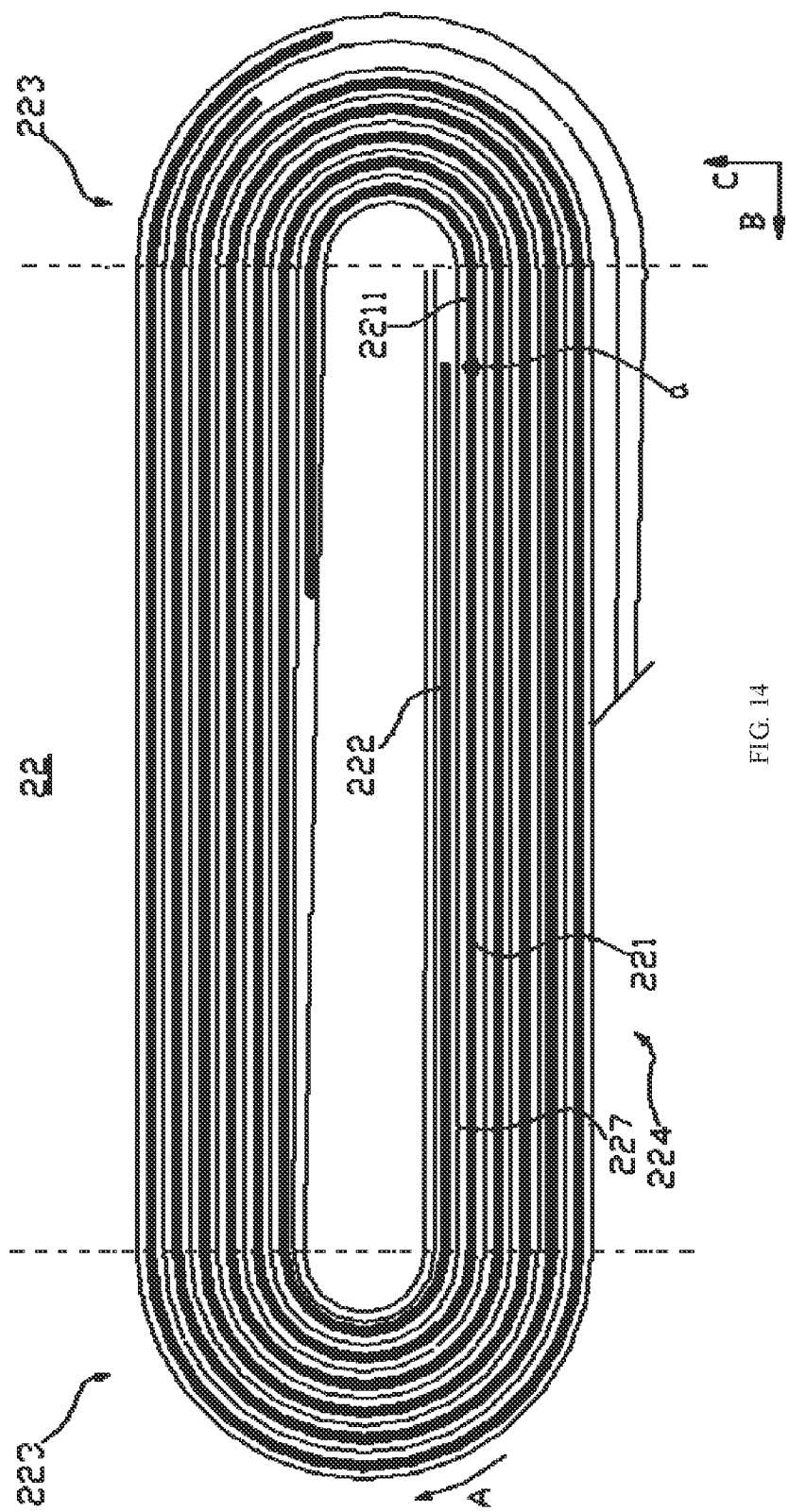
FIG. 14 is schematic structural diagram of an electrode assembly provided by other embodiments of the present application.

It should be noted that, according to some of the above embodiments, the junction (first junction a) of the first segment 2211 and the second segment 2212 may also be located at the inner side of the winding starting end 225b of the second electrode plate 222. In some other embodiments, please refer to FIG. 14. FIG. 14 is schematic structural diagram of an electrode assembly 22 provided by still other embodiments of the present application. The junction (first junction a) of the first segment 2211 and the second segment 2212 may also be located at the outer side of the winding starting end 225b of the second electrode plate 222. In this case, at least a part of the first segment 2211 is supported at the inner side of the second segment 222 in the bending region 223.

It should be noted that the first segment 2211 is at least partially supported at the inner side of the second electrode plate 222 in the bending region 223, and the part of the first segment 2211 located in the bending region 223 may directly contact the second electrode plate 222 to support at the inner side of the second electrode plate 222. Or it may be that the part of the first segment 2211 located in the bending region 223 is supported at the inner side of the second electrode plate 222 by the separator 227. The separator 227 can isolate the first segment 2211 from the second electrode plate 222, the part of the first segment 2211 located in the bending region 223 is in contact with the separator 227, and the separator 227 is in contact with the second electrode plate 222 to realize the transmission of force.

In the present embodiment, the first electrode plate 221 may be a positive electrode plate or a negative electrode plate.

In the embodiment of the present application, whether the junction between the first segment 2211 and the second segment 2212 (the first junction a) is located at the inner side of the winding starting end 225b of the second electrode plate 222, or the junction of the first segment 2211 and the second segment 2212 (the first junction a) is located at the outer side of the winding starting end 225b of the second electrode plate 222, the winding starting end 225a of the first electrode plate 221 may be located in the straight region 224 or the bending region 223; the winding starting end 225b of the second electrode plate 222 may be located in the straight region 224 or in the bending region 223.

In the embodiment of the present application, at least a part of the first segment 2211 of the first electrode plate 221 is configured to provide a support force to the part of the first electrode plate 221 and the second electrode plate 222 in the bending region 223 located at the outer side of the first segment 2211. It may be that the first segment 2211 only supports the electrode plate at the outer side of the first segment 2211 in one bending region 223, or the first segment 2211 supports the electrode plates in two bending regions 223, which depends on the length of the first segment 2211.

In some embodiments, the length of the first segment 2211 is L1, the length of the first subsegment 2212a is L2, and the relationship satisfied by L1 and L2 may be: $3\ mm \leq L1 \leq 6*L2$.

In some embodiments, please continue to refer to FIG. 5, the first segment 2211 is wound inward from its junction with the second segment 2212 (first junction a) and extended around a bending region 223. That is, the first segment 2211 only supports the electrode plates in one bending region 223, and the first segment 2211 only includes one bending portion 2211a. The first segment 2211 of this structure is shorter, which saves materials and reduces costs.

Optionally, the winding starting end 225a of the first electrode plate 221 and the winding starting end 225b of the second electrode plate 222 are both located in the straight region 224. A part of the first electrode plate 221 extending from the winding starting end 225a of the first electrode plate 221 to one of the bending regions 223 and a part of the second electrode plate 222 extending from the winding starting end 225b of the second electrode plate 222 to the other bending region 223 are staggered in a second direction C. The second direction C is perpendicular to the first direction B and the straight region 224. This structure can effectively reduce a thickness difference between the two sides of the winding structure in the first direction B, ensure the consistency of the thickness of the two sides of the vu riding structure in the first direction B, and improve the energy density of the electrode assembly 22.

A second direction C is perpendicular to the straight region 224, which can be understood as the second direction C perpendicular to the part of the first electrode plate 221 and the second electrode plate 222 located in the straight region 224. The second direction C is a thickness direction of the winding structure, the second direction C is also the thickness direction of the part of the first electrode plate 221 and the second electrode plate 222 located in the straight region 224.

The part of the first electrode plate 221 extending from the winding starting end 225a of the first electrode plate 221 to a bending region 223 is the first portion 2211b. The first portion 2211b is located in the straight region 224, and the first portion 2211b borders the bending portion 2211a, and the junction of the first portion 2211b and the bending portion 2211a is located at the junction of the straight region 224 and the bending region 223. The part of the second electrode plate 222 extends from the winding starting end 225b of the second electrode plate 222 to the other bending region 223 is the second portion 2221, and the second portion 2221 is located in the straight region 224.

Exemplarily, the relationship satisfied by L1 and L2 may be: 3 mm≤L1<0.75*L2.

Figure 15:
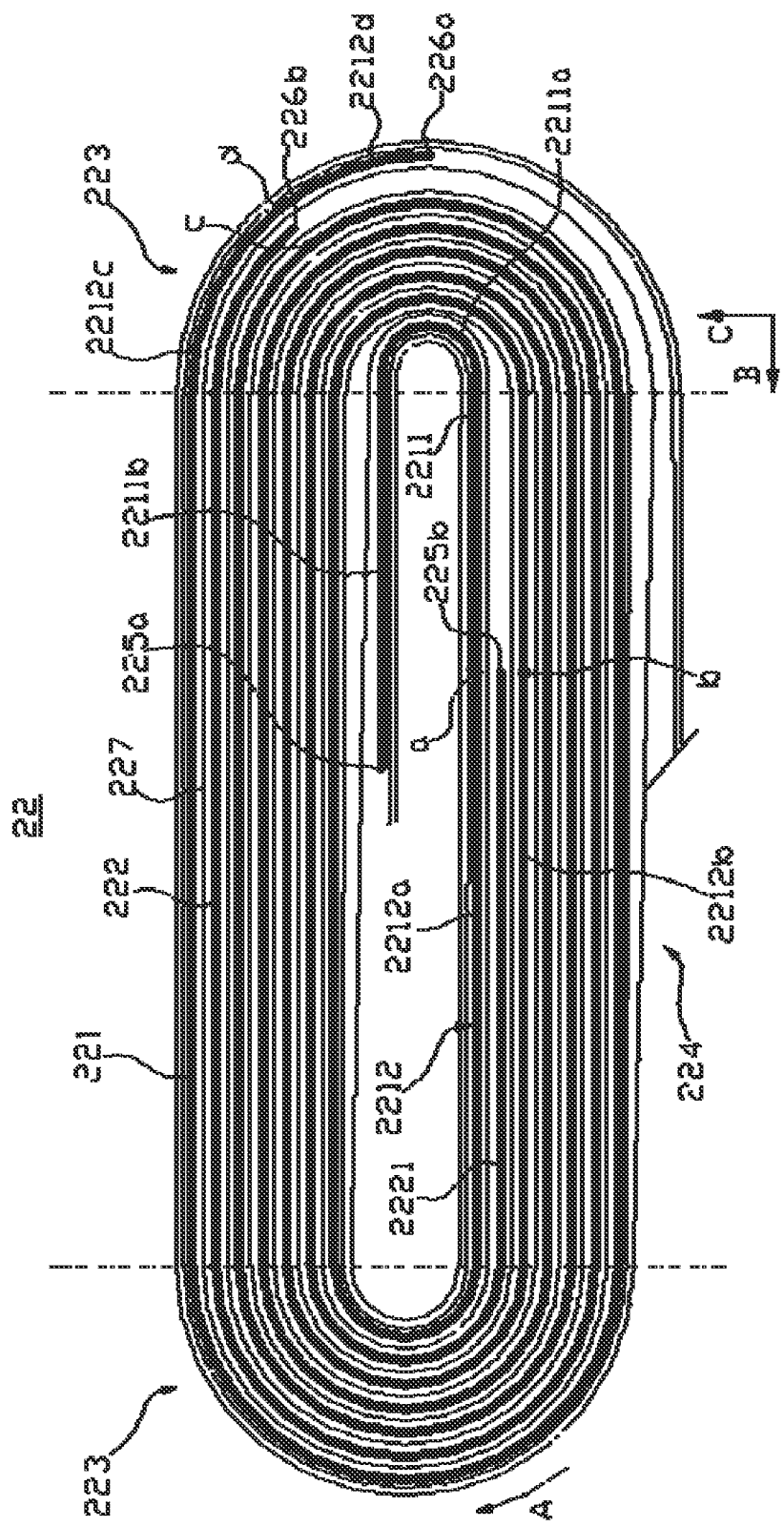
FIG. 15 is schematic structural diagram of an electrode assembly provided by yet another embodiments of the present application.

In other embodiments, please refer to FIG. 15. FIG. 15 is schematic structural diagram of an electrode assembly 22 provided by still another embodiments of the present application. It may be that the part of the first electrode plate 221 extends from the winding starting end 225a of the first electrode plate 221 to one bending area 223 and the part of the second electrode plate 222 extends from the winding starting end 225b of the second electrode plate 222 to the other bending region 223 at least partially overlaps in the second direction C. That is, the first portion 2211b and the second portion 2221 at least partially overlap. The at least partial overlap here means that the projection of the first portion 2211b in the second direction C and the projection of the second portion 2221 in the second direction C at least partially overlap.

Figure 16:
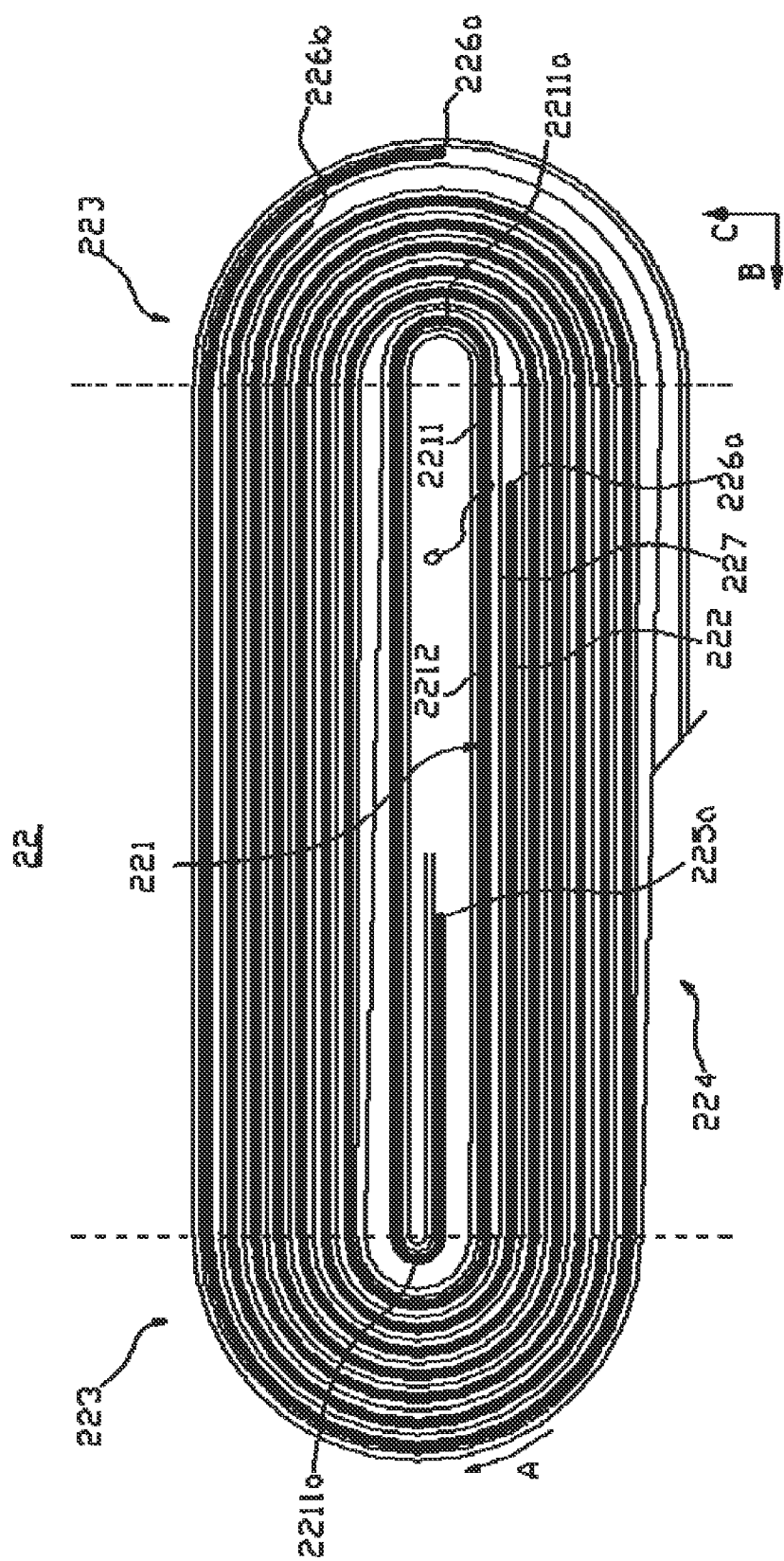
FIG. 16 is a schematic structural diagram of an electrode assembly provided by still other embodiments of the present application.
Figure 17:
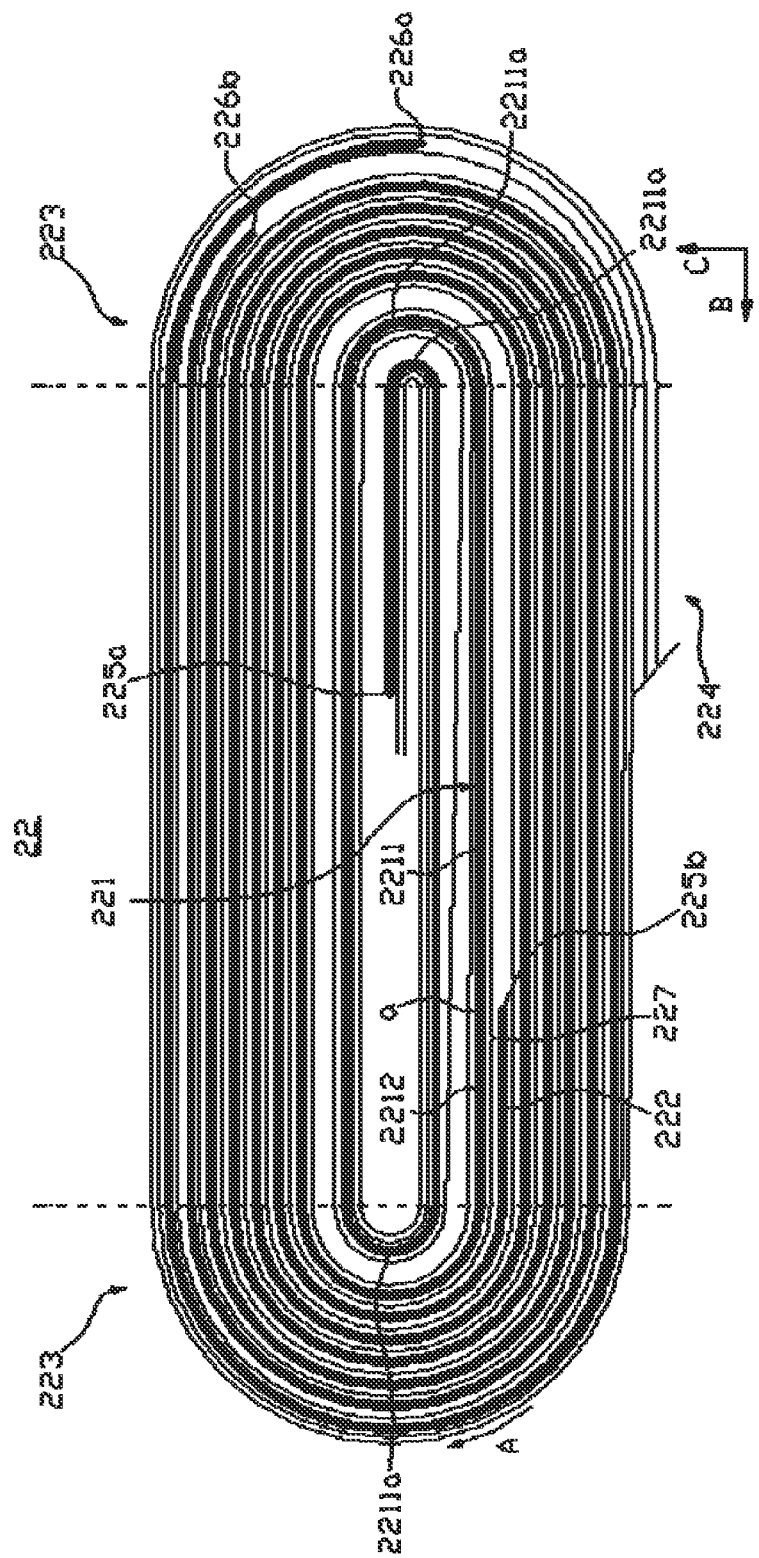
FIG. 17 is another schematic structural diagram of an electrode assembly provided by still yet still other embodiments of the present application.

In some embodiments, please refer to FIG. 16 and FIG. 17. FIG. 16 is a schematic structural diagram of an electrode assembly 22 provided by some other embodiments of the present application, and FIG. 17 is another schematic structural diagram of an electrode assembly 22 provided by still some other embodiments of the present application. The first segment 2211 extends inward from its junction with the second segment 2212 (the first junction a) and around the two bending regions 223. That is, the first segment 2211 can support the electrode plate at the two bending regions 223. The first segment 2211 can provide a support force for the parts of the first electrode plate 221 and the second electrode plate 222 located in the two bending regions 223, so that part of structure of the first electrode plate 221 and the second electrode plate 222 is more compact in the two bending area 223, which reduces the occurrence of lithium plating.

In this embodiment, the first segment 2211 includes a plurality of bending portions 2211a, a part of the bending portions 2211a are located in one bending region 223, and the other part of the bending portions 2211a are located in another bending region 223.

In a non-limiting example, as shown in FIG. 16, the first segment 2211 includes two bending portions 2211a, and the two bending portions 2211a are located in the two bending regions 223 respectively, Exemplarily, the relationship satisfied by L1 and L2 may be: 0.75*L2≤L1<1.25*L2.

In another non-limiting example, as shown in FIG. 17, the first segment 2211 includes three bending portions 2211a, one bending portion 2211a is located in one bending region 223, and the other two bending portions 2211a are located in the other bending region 223.

Exemplarily, the relationship satisfied by L1 and L2 may be: 1.25*L2≤L1≤6*L2.

Figure 18:
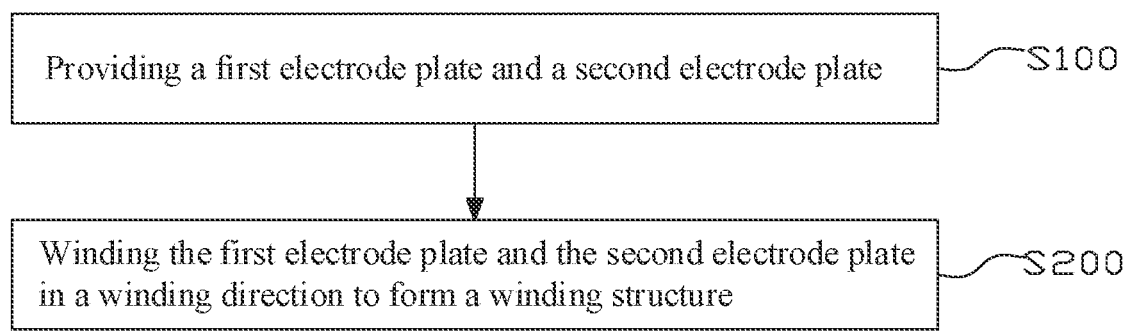
FIG. 18 is a flowchart of a manufacturing method of an electrode assembly provided by some embodiments of the present application.

Please refer to FIG. 18. FIG. 18 is a flowchart of an electrode assembly 22 manufacturing method according to some embodiments of the present application. The manufacturing method of the electrode assembly 22 includes:

S100: providing a first electrode plate 221 and a second electrode plate 222;

S200: winding the first electrode plate 221 and the second electrode plate 222 in the winding direction A to form a winding structure, and the winding structure includes a bending region 223.

Here, the first electrode plate 221 includes a first segment 2211 that exceeds a winding starting end 225a of the first electrode plate 221, and at least a part of the first segment 2211 is configured to provide a support force to a part of the first electrode plate 221 and the second electrode plate 222 in the bending region 223 and located at an outer side of the first segment 2211.

In some embodiments, a separator 227 for isolating the first electrode plate 221 and the second electrode plate 222 is further provided, and the first electrode plate 221, the separator 227 and the second electrode plate 222 are wound along the winding direction A to form a winding structure.

For the related structure of the electrode assembly 22 manufactured by the above manufacturing method, please refer to the electrode assembly 22 provided in the above respective embodiments.

Figure 19:
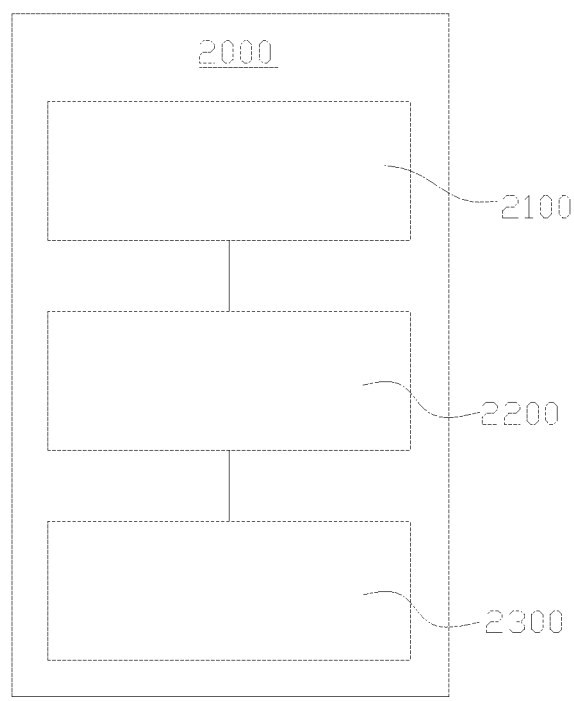
FIG. 19 is a schematic block diagram of a manufacturing device for an electrode assembly provided by some embodiments of the present application.

Please refer to FIG. 19. FIG. 19 is a schematic block diagram of a manufacturing device 2000 for an electrode assembly 22 provided by some embodiments of the present application. The electrode assembly 22 includes a first providing apparatus 2100, a second providing apparatus 2200 and an assembly apparatus 2300.

The first providing apparatus 2100 is configured to provide the first electrode plate 221. The second providing apparatus 2200 is configured to provide the second electrode plate 222. The assembling apparatus 2300 is configured to wind the first electrode plate 221 and the second electrode plate 222 in the winding direction A to form a winding structure, and the winding structure includes a bending region 223.

Here, the first electrode plate 221 includes a first segment 2211 that exceeds a winding starting end 225a of the first electrode plate 221, and at least a part of the first segment 2211 is configured to provide a support force to a part of the first electrode plate 221 and the second electrode plate 222 in the bending region 223 and located at an outer side of the first segment 2211.

In some embodiments, the manufacturing device 2000 of the electrode assembly 22 further includes a third providing apparatus (not shown in the figure), and the third providing apparatus is configured to provide an separator 227 that isolates the first electrode plate 221 and the second electrode plate 222. The assembling apparatus 2300 is configured to wind the first electrode plate 221, the separator 227 and the second electrode plate 222 along the winding direction A to form a winding structure.

For the related structure of the electrode assembly 22 manufactured by the above manufacturing device 2000, please refer to the electrode assembly 22 provided in the above respective embodiments.

It should be noted that, the embodiments in the present application and features in the embodiments may be mutually combined provided that no conflict is caused.

The above embodiments are merely used to illustrate the technical solution of the present application, but are not intended to limit the present application. For those skilled in the art, the present application may have various amendments and modifications. Any modification, equivalent substitution, improvement etc., made within the spirit and principle of the present application shall fall within the protection scope of the present application.

What is claimed is:

1. An electrode assembly, comprising a first electrode plate and a second electrode plate, wherein the first electrode plate and the second electrode plate are wound in a winding direction to form a winding structure, and the winding structure comprises a bending region and a straight region, and both ends of the straight region are provided with bending regions;
   the first electrode plate comprises a first segment that exceeds a winding starting end of the second electrode plate in a winding direction, and at least a part of the first segment is configured to provide a support force to a part of the first electrode plate and the second electrode plate in the bending region located at an outer side of the first segment;
   the first electrode plate further comprises a second segment continuously arranged with the first segment along the winding direction, a junction of the first segment and the second segment is located at an inner side of the winding starting end of the second electrode plate;
   the electrode assembly further comprises a separator for isolating the first electrode plate from the second electrode plate, the part of the first segment in the bending region is supported at the inner side of the second segment in the bending region through the separator; and,
   the separator exceeds the winding starting end of the first electrode plate, and the part of the separator that exceeds the winding starting end of the first electrode plate is wound toward the inner side of the first segment.

2. The electrode assembly according to claim 1, wherein the second segment comprises a first subsegment continuously arranged with the first segment along the winding direction;
   only the outer side of the first subsegment is opposite to second electrode plate, the first subsegment is wound one lap outward along the winding direction from the junction; and
   the first segment comprises a bending portion bent and arranged in the bending region, and the bending portion is supported at the first subsegment in the bending region.

3. The electrode assembly according to claim 2, wherein both surfaces of the first subsegment are coated with active material layers; or one surface of the first subsegment opposite to second electrode plate is coated with an active material layer, and the other surface of the subsegment is not coated with an active material layer.

4. The electrode assembly according to claim 2, wherein the second segment further comprises a second subsegment and a third subsegment;
   the first segment, the first subsegment, the second subsegment, and the third subsegment are continuously arranged along the winding direction in sequence;
   both surfaces of the second subsegment are opposite to second electrode plate;
   only the inner side of the third subsegment is opposite to second electrode plate;
   wherein both surfaces of the third subsegment are coated with active material layers; or one surface of the third subsegment opposite to second electrode plate is coated with an active material layer, and the other surface of the third subsegment is not coated with an active material layer.

5. The electrode assembly according to claim 4, wherein the second segment further comprises a fourth subsegment;
   the first segment, the first subsegment, the second subsegment, the third subsegment, and the fourth subsegment are continuously arranged along the winding in sequence;
   neither surface of the fourth subsegment is opposite to second electrode plate; and
   both surfaces of the fourth subsegment are coated with active material layers, or one surface of the fourth subsegment located at an inner side of the fourth subsegment is coated with an active material layer, and the other surface of the fourth subsegment is not coated with an active material layer.

6. The electrode assembly according to claim 1, wherein a winding starting end of the first electrode plate is located in the straight region; and/or, the winding starting end of the second electrode plate is located in the straight region.

7. The electrode assembly according to claim 6, wherein the first segment is wound inward from the junction and extended around one of the bending regions.

8. The electrode assembly according to claim 7, wherein the winding starting end of the first electrode plate and the winding starting end of the second electrode plate are both located in the straight region;
   two bending regions are located at two ends of the straight region in a first direction;
   a part of the first electrode plate extending from the winding starting end of the first electrode plate to one of the bending regions and a part of the second electrode plate extending from the winding starting end of the second electrode plate to the other bending region are staggered in a second direction; and
   the second direction is perpendicular to the first direction and the straight region.

9. The electrode assembly according to claim 6, wherein the first segment is wound inward from the junction and extended around the two bending regions.

10. The electrode assembly according to claim 1, wherein the first electrode plate is a negative electrode plate, and the second electrode plate is a positive electrode plate.

11. The electrode assembly according to claim 10, wherein both surfaces of the first segment are coated with negative active material layers.

12. A battery cell, comprising a shell and the electrode assembly according to claim 1; and
   the electrode assembly being accommodated in the shell.

13. A battery, comprising a box body, and the battery cell according to claim 12; and the battery cell being accommodated in the box body.

14. A power consumption device, comprising the battery according to claim 13.

\* \* \* \* \*